United States Patent
Posva et al.

(10) Patent No.: US 8,356,297 B1
(45) Date of Patent: Jan. 15, 2013

(54) EXTERNAL DATA SOURCE REDIRECTION IN SEGMENTED VIRTUAL MACHINE

(75) Inventors: Ivan Posva, Mountain View, CA (US); Daniel Dwight Grove, Mercer Island, WA (US); Anirban Sengupta, Sunnyvale, CA (US); Sivakumar Annamalai, Cupertino, CA (US); Gil Tene, Palo Alto, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 1376 days.

(21) Appl. No.: 11/726,695

(22) Filed: Mar. 21, 2007

(51) Int. Cl.
*G06F 9/455* (2006.01)

(52) U.S. Cl. .......................................... 718/1

(58) Field of Classification Search .................. None
See application file for complete search history.

(56) References Cited

U.S. PATENT DOCUMENTS

| | | | |
|---|---|---|---|
| 4,849,880 A | 7/1989 | Bhaskar et al. | |
| 5,479,643 A | 12/1995 | Bhaskar et al. | |
| 5,774,728 A | 6/1998 | Breslau et al. | |
| 6,003,065 A | 12/1999 | Yan et al. | |
| 6,112,279 A * | 8/2000 | Wang | 711/119 |
| 6,230,118 B1 | 5/2001 | Bader et al. | |
| 6,345,311 B1 | 2/2002 | Breslau et al. | |
| 6,385,643 B1 | 5/2002 | Jacobs et al. | |
| 6,397,242 B1 | 5/2002 | Devine et al. | |
| 6,463,459 B1 * | 10/2002 | Orr et al. | 709/203 |
| 6,625,751 B1 | 9/2003 | Starovic et al. | |
| 6,738,977 B1 | 5/2004 | Berry et al. | |
| 6,802,062 B1 | 10/2004 | Oyamada et al. | |
| 6,968,539 B1 | 11/2005 | Huang et al. | |
| 7,036,122 B2 | 4/2006 | Bennett et al. | |
| 7,080,378 B1 * | 7/2006 | Noland et al. | 718/104 |
| 7,114,157 B2 | 9/2006 | Chaffee et al. | |
| 7,213,246 B1 * | 5/2007 | van Rietschote et al. | 718/1 |
| 7,272,799 B2 | 9/2007 | Imada et al. | |
| 7,313,793 B2 | 12/2007 | Traut et al. | |
| 7,401,178 B1 * | 7/2008 | Tene et al. | 711/6 |
| 7,480,908 B1 * | 1/2009 | Tene et al. | 718/1 |
| 7,536,688 B2 * | 5/2009 | Tene et al. | 718/1 |
| 7,620,953 B1 * | 11/2009 | Tene et al. | 718/104 |
| 7,669,202 B1 * | 2/2010 | Tene et al. | 718/1 |
| 7,742,398 B1 * | 6/2010 | Tene et al. | 370/217 |
| 7,801,154 B2 * | 9/2010 | Schrock | 370/395.53 |

(Continued)

OTHER PUBLICATIONS

Wheeler, James G., "SmartArrays and Java Frequently Asked Questions", Feb. 5, 2002, SmartArrays, Inc. p. 1-5.

(Continued)

*Primary Examiner* — Emerson Puente
*Assistant Examiner* — Hiren Patel
(74) *Attorney, Agent, or Firm* — Van Pelt, Yi & James LLP (57) ABSTRACT

Interacting with an external environment of a segmented virtual machine is disclosed. An indication that a communication with an external environment is desired is received. It is determined whether the communication can be initiated directly from a core virtual machine of the segmented virtual machine without initiating the communication from a shell virtual machine of the segmented virtual machine. An attempt to initiate the communication is made based as at least in part on the determination.

51 Claims, 7 Drawing Sheets

U.S. PATENT DOCUMENTS

| | | |
|---|---|---|
| 2001/0034771 A1 | 10/2001 | Hutsch et al. |
| 2002/0138578 A1 | 9/2002 | Zhou |
| 2002/0184287 A1 | 12/2002 | Nunally |
| 2003/0217092 A1 | 11/2003 | Veselov |
| 2003/0229794 A1 | 12/2003 | Sutton et al. |
| 2004/0073552 A1 | 4/2004 | Bailey et al. |
| 2004/0148608 A1 | 7/2004 | Gendreau et al. |
| 2004/0172629 A1* | 9/2004 | Tene et al. ............... 718/1 |
| 2005/0076326 A1 | 4/2005 | McMillan et al. |
| 2005/0108709 A1* | 5/2005 | Sciandra et al. ............... 718/1 |
| 2005/0132367 A1* | 6/2005 | Tewari et al. ............... 718/1 |

OTHER PUBLICATIONS

Mayers, Chris, "Using Remote Procedure Call Standards", Mar. 24, 1996, Architecture Projects Management Limited, p. 1-14.

Czajkowski, Grzegorz et al., "Automated and Portable Native Code Isolation", Sun Microsystems, SMLI TR-2001-96, Apr. 2001.

* cited by examiner

EXTERNAL DATA SOURCE REDIRECTION IN SEGMENTED VIRTUAL MACHINE

BACKGROUND OF THE INVENTION

An increasing number of software applications are written to platform independent execution environments such as the Java Runtime Environment and the .NET Common Language Runtime. These applications generally execute within a virtual machine (VM) that provides a level of abstraction between the program execution environment and the external software interface. Applications often use middleware frameworks on top of these execution environments. Examples of such frameworks are J2EE application servers and .NET application servers.

A general purpose device, such as a computer, commonly has finite resources. If each VM's execution resources is provided by the general purpose device, any such device can only support a limited number of applications and VM's. Data centers often need to support a significant number of applications. As a result, a large number of general purpose devices are deployed for resource planning purposes, with each application allotted enough resources for its peak needs, making such a setup costly to deploy and administer.

Figure 1:
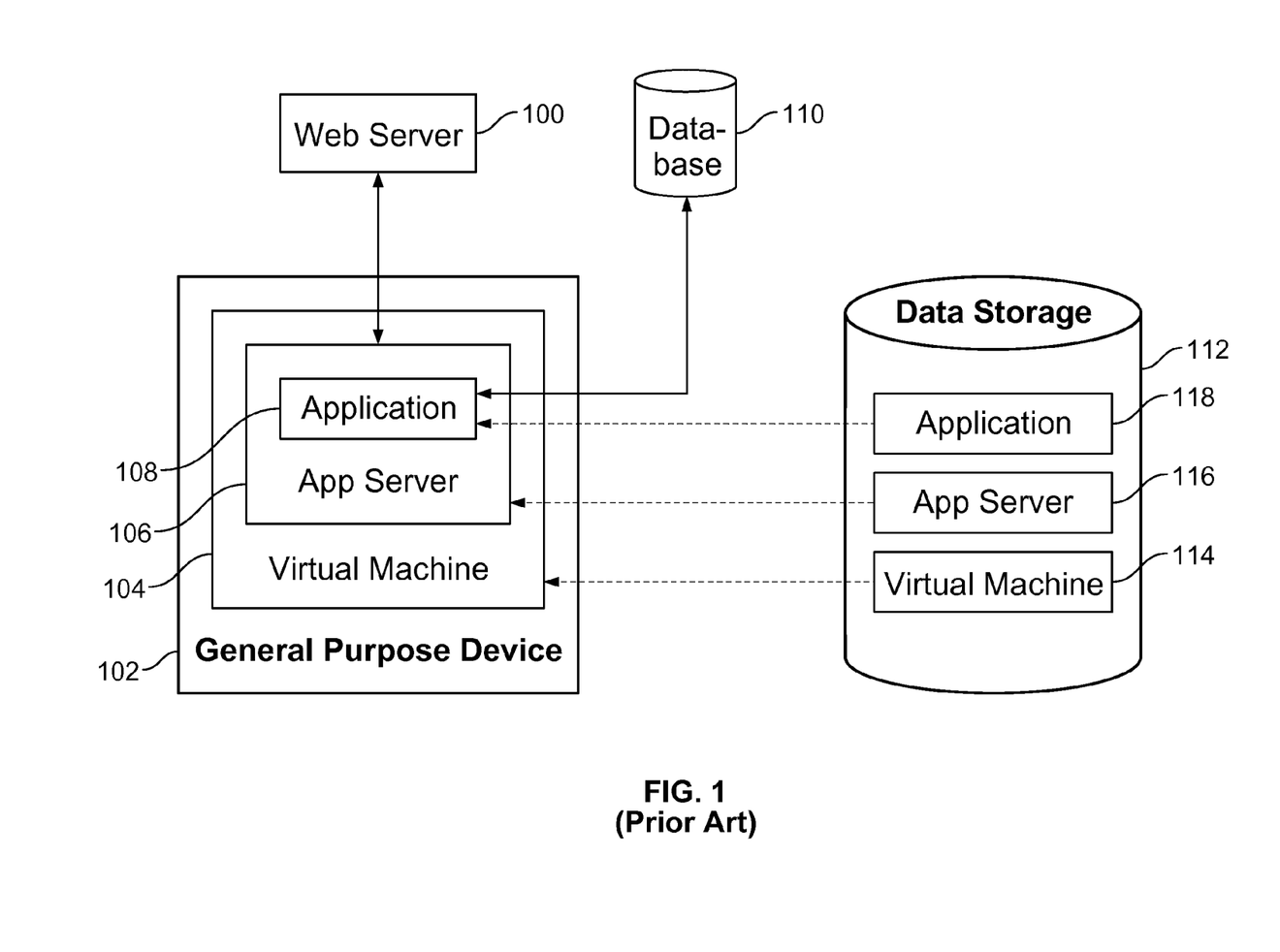
FIG. 1 is a block diagram illustrating an example system configuration for running web applications using J2EE application server frameworks.

FIG. 1 is a block diagram illustrating an example system configuration for running web applications using J2EE application server frameworks. A user request is intercepted by a web server 100 and is directed to an appropriate general purpose device 102. Software components including VM 114, application server 116, and application 118 are stored on a data storage device 112 that is accessible from general purpose device 102. At initialization time, the stored software components are loaded into general purpose device 102. The runtime instantiations of the software components include VM 104, application server 106 and application 108. VM 104 launches application server 106, which in turn launches application 108. The application handles the user requests, processes the business logic associated with the requests, and communicates with database 110 if appropriate, and passes the result back to the web server.

Traditionally in order to support a large number of applications, a large number of general purpose devices are deployed to accommodate the peak resource needs of the applications. It is desirable to have a way to provide large scale application support at reduced deployment and administration costs. Also, given the existing investment in middleware frameworks and applications, an effective solution to the problem should be backward compatible with the existing applications and frameworks.

In one solution, the VM segments its functionality into a shell VM and a core VM that are separate. The shell VM performs interactions with the external environment. The core VM performs VM internal execution functions including managing memory, performing computations, transferring data, processing data and processing logic. The core VM communicates through the shell VM for interaction with the external environment. Resources consumed by the core VM are separate, both logically and physically, from those consumed by the shell VM. The external environment does not need to be aware of the VM segmentation and can interact solely with the shell VM. To the external environment, the distribution of VM internal execution functions and shell functions appears transparent. The shell VM appears as a complete VM, even though it does not consume resources needed for VM internal execution.

Since all external network and I/O communications are performed via the shell VM, scaling the performance of the segmented VM can become limited by capabilities of the shell VM host to perform the external communications. Therefore, there exists a need to perform external communications on the segmented VM more efficiently.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 2A:
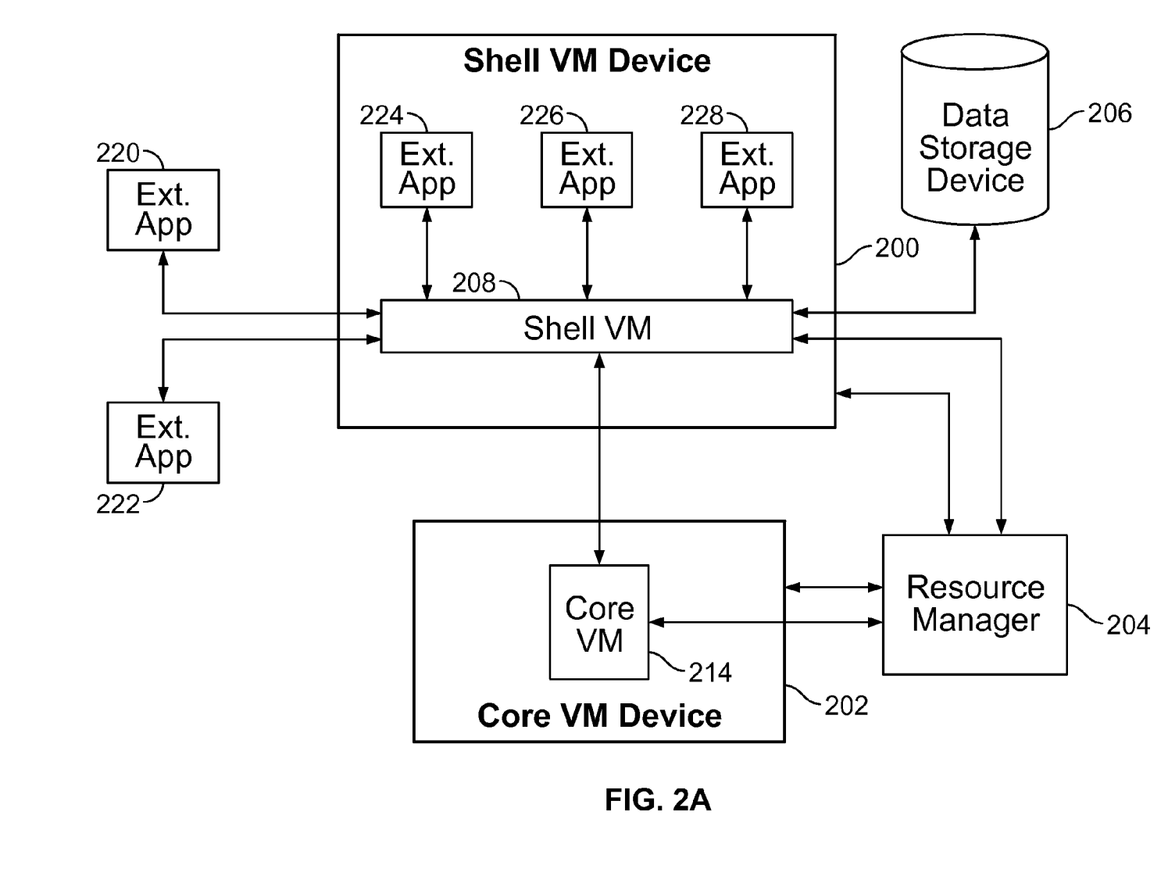
FIG. 2A is a block diagram illustrating a system embodiment according to the present invention.

FIG. 2A is a block diagram illustrating a system embodiment according to the present invention. The system includes a shell VM device 200, a core VM device 202, a resource manager 204 and a data storage device 206. The shell and core VM devices can be implemented using a wide range of hardware that is capable of executing software. Such devices include full computer systems, processors, application specific integrated circuits (ASIC's), or any other appropriate device. Shell VM 208 resides on the shell VM device and core VM 214 resides on the core VM device. Applications 220, 222, 224, 226 and 228 are referred to as external applications because their execution environment is independent of the VM. These external applications communicate with the shell VM to perform various functions. They may be located external to the Shell VM device (220 and 222), or on the Shell VM device (224, 226 and 228). These external applications interact with shell VM 208 directly, which may relay some of the interactions to core VM 214.

The shell VM may utilize one or more communications interfaces on the shell VM device to communicate with the external applications as well as with the core VM on a core VM device. In some embodiments, the shell VM also communicates with one or more data storage devices, and optionally with the resource manager. The interfaces are separate in some embodiments and shared in others. The shell VM may also communicate with applications that reside on the shell VM device. The core VM may utilize one or more communication interfaces on the core VM device to communicate with the shell VM on a shell VM device. In some embodiments, the core VM also communicates with the data storage device, and optionally the resource manager.

Both the shell and core VM devices may communicate with the data storage device to load necessary software components. A resource manager 204 may communicate with the shell VM, the core VM, the shell VM device and the core VM device, allocating and managing system resources. The resource manager is an optional part of the system and may be omitted in some embodiments.

Figure 2B:
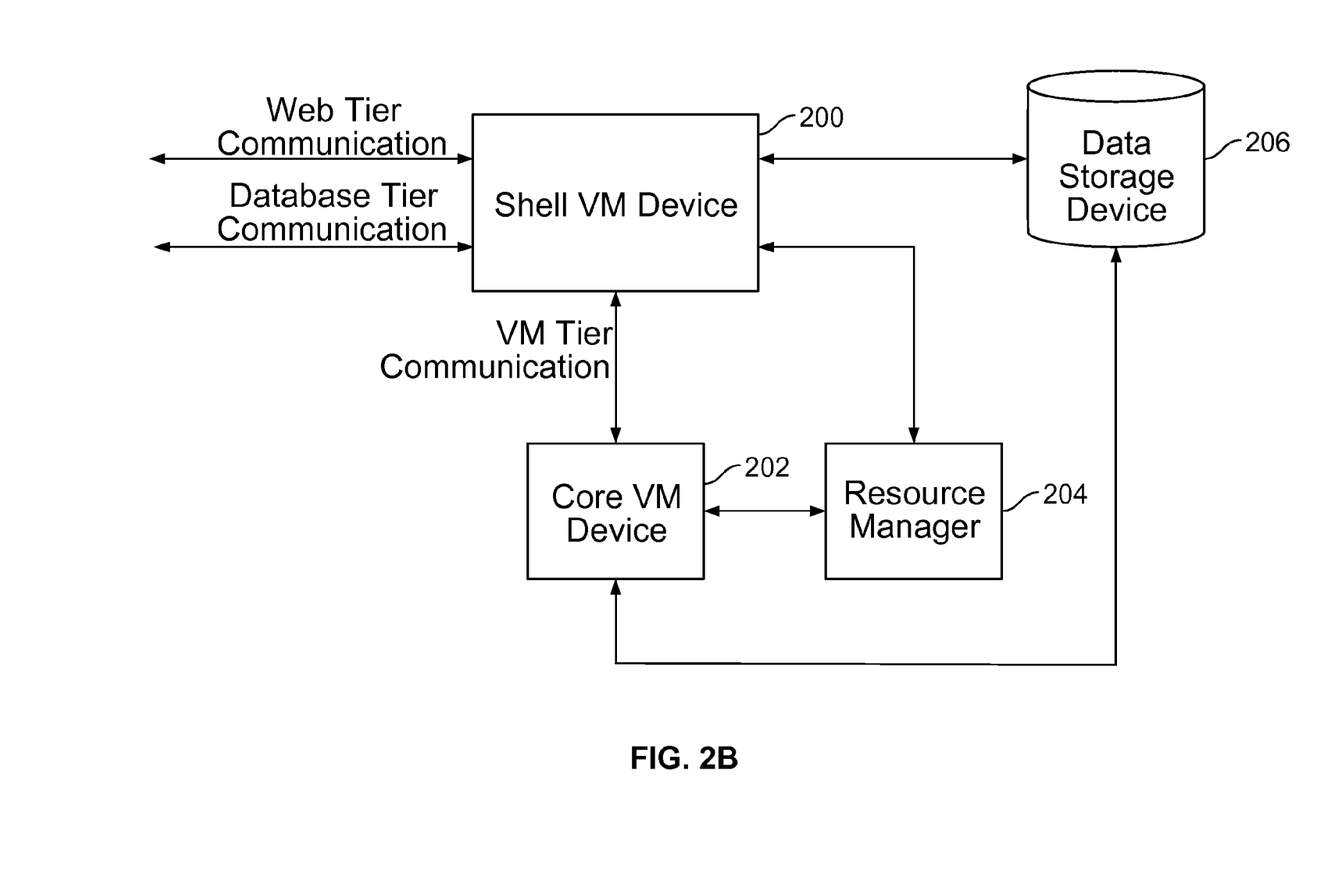
FIG. 2B is a block diagram illustrating an example system according to the present invention within a typical application server deployment.

FIG. 2B is a block diagram illustrating an example system according to the present invention within a typical application server deployment. The system includes a shell VM device 200 that includes a shell VM, a core VM device 202 that includes the core VM, a resource manager 204 and a data storage device 206. In this example, the shell VM communicates with a web tier application and a database tier application that are both external to the shell VM device. It also communicates with core VM on the core VM device, a data storage device and a resource manager.

Figure 2C:
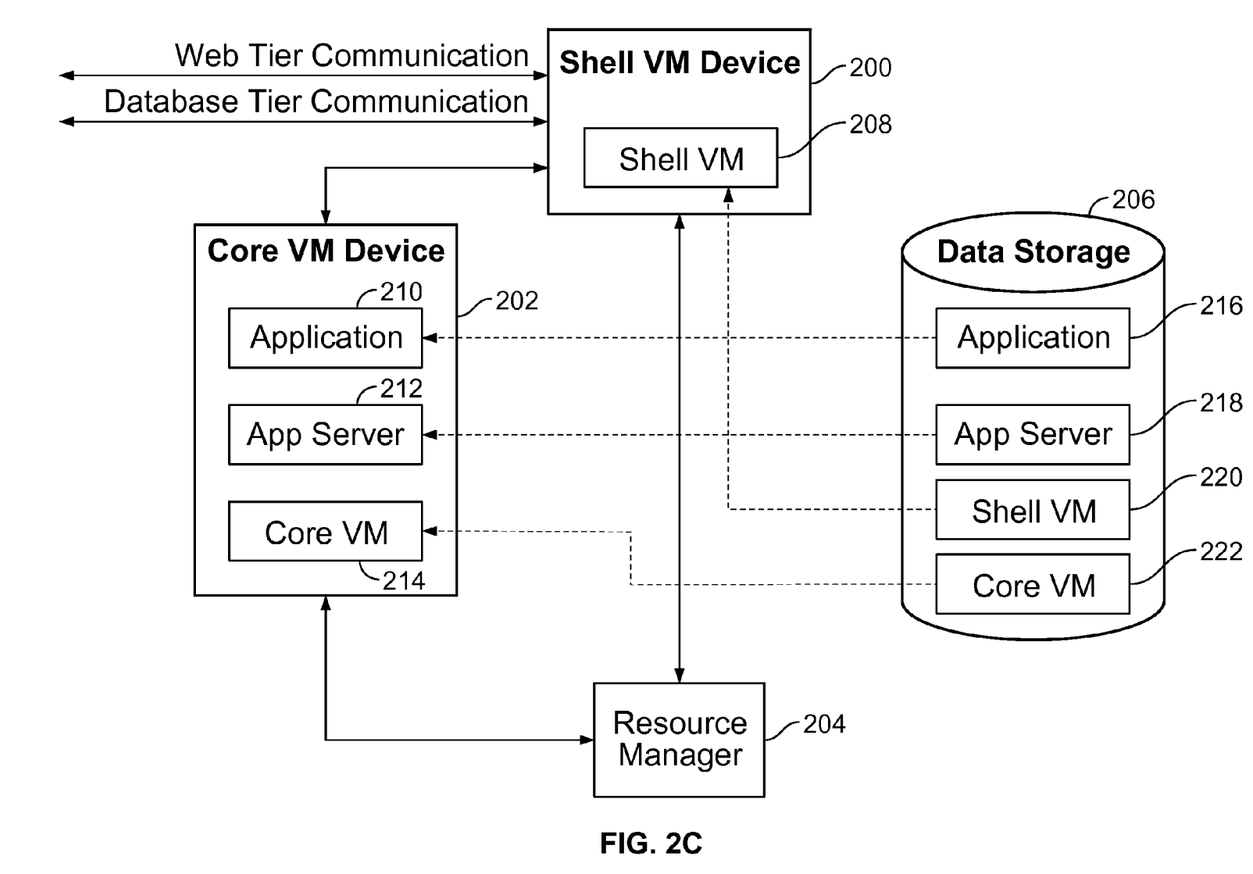
FIG. 2C is a more detailed block diagram of the example system shown in FIG. 2B.

FIG. 2C is a more detailed block diagram of the example system shown in FIG. 2B. Data storage device 206 stores various software components including application 216, application server 218, shell VM 220 and core VM 222. In other embodiments, the numbers of instances for each type of software component may vary. During initialization, instead of loading software components onto the same device, the shell VM is loaded onto shell VM device 200, whereas the application, the application server and the core VM are loaded onto core VM device 202. The dashed lines indicate the loading of software components from the data storage device to the VM devices.

The shell and core VM segment the functionality of a conventional VM. In the example shown, the shell VM performs interactions with the external environment. For a user, a web server or a database that comes from the external environment, the interaction with the shell VM device is transparent; that is, the interaction appears to be substantially the same as the interaction with the general purpose device shown in FIG. 1. The shell VM appears to receive and respond to requests in substantially the same way as the conventional VM shown in FIG. 1. An existing system similar to the one shown in FIG. 1 can be transparently switched to using a new configuration similar to FIGS. 2A and 2B without modifying the code for the application.

The external environment interacts with the system by sending requests to the shell VM device. Examples of the external environment includes a web server, a user, a messaging engine, a journaling facility, a load distributor, a network storage device, a database, and any networked node, system, process, service, and entity. There are many ways to conduct the interaction, including through system calls, networking calls, file input/output (I/O) calls, etc. In some embodiments, the interaction includes using a native interface call such as Java Native Interface (JNI) calls for Java VMs or calls using the platform invoke mechanism in a .NET VM.

Requests to the VM (e.g., calls into the VM) are intercepted by shell VM 208 and forwarded to core VM 214 on core VM device 202. The calls are forwarded to the core VM using a predefined communication scheme. In one embodiment, the forwarding is performed via remote procedure calls (RPC's). The calls are received and processed by core VM 214, and then further processed by application server 212 and application 210. The processed result is sent to the shell VM, and eventually passed back to the caller. The core VM supports VM internal execution functionality such as maintaining memory and performing data processing in a way similar to a conventional VM.

Segmenting functionality between a shell VM and a core VM improves the system's scalability, manageability, flexibility and efficiency. Since a shell VM is relatively lightweight and consumes fewer resources than a conventional VM, many instances of the shell VM can run on the same shell VM device. Similarly, many instances of core VM's, application servers and applications can run on the same core VM device. Since the shell VM's and the core VM's communicate via a network, there does not need to be a strict physical correspondence between the devices. A core VM device can concurrently host multiple core VM's and support multiple applications invoked by shell VM's from heterogeneous shell VM devices having different operating systems. Similarly, a shell VM device can concurrently support multiple shell VM's invoking applications on heterogeneous core VM devices.

In some embodiments, the core VM device includes specialized hardware designed to improve the performance of the core VM functionality. Many instances of core VM's executing application servers and applications can simultaneously reside on the same core VM device. The core VM device can concurrently support multiple applications invoked from heterogeneous shell VM devices. In one embodiment, a multiprocessor device with specialized hardware assists the core VM functionality. The device has the capacity to concurrently support many instances of the core VM software, executing applications and application servers, simplifying administration and increasing efficiency compared to a multitude of general purpose systems as shown in FIG. 1.

Typically the shell VM supports interactions with the external environment such as system calls, file I/O, networking in a way similar to a conventional VM. Calls originating from the VM or the application executing within it are intercepted by core VM 214 and forwarded to shell VM 208 on shell VM device 200. The calls are forwarded to the shell VM using a predefined communication scheme. In one embodiment, the forwarding is performed via RPC's. The calls are received and processed by shell VM 208 which translates them into the proper interactions with the external environment. The processed result is sent to the core VM, and eventually passed back to the caller.

Using the core VM of a segmented VM to directly support interactions with the external environment is disclosed. In some embodiments, if an external communication is determined to be potentially supported by the core VM, the core VM attempts to support the external communication. If the external communication is determined to be not supported by the core VM, the shell VM supports the external communication. In some embodiments, a portion of the external communications is supported by the core VM while another portion of the external communications is supported by the shell VM. By allowing the core VM to support interactions with the external environment, less resource of the shell VM device is required for external environment interaction support. This allows greater scalability for the segmented VM.

Figure 3:
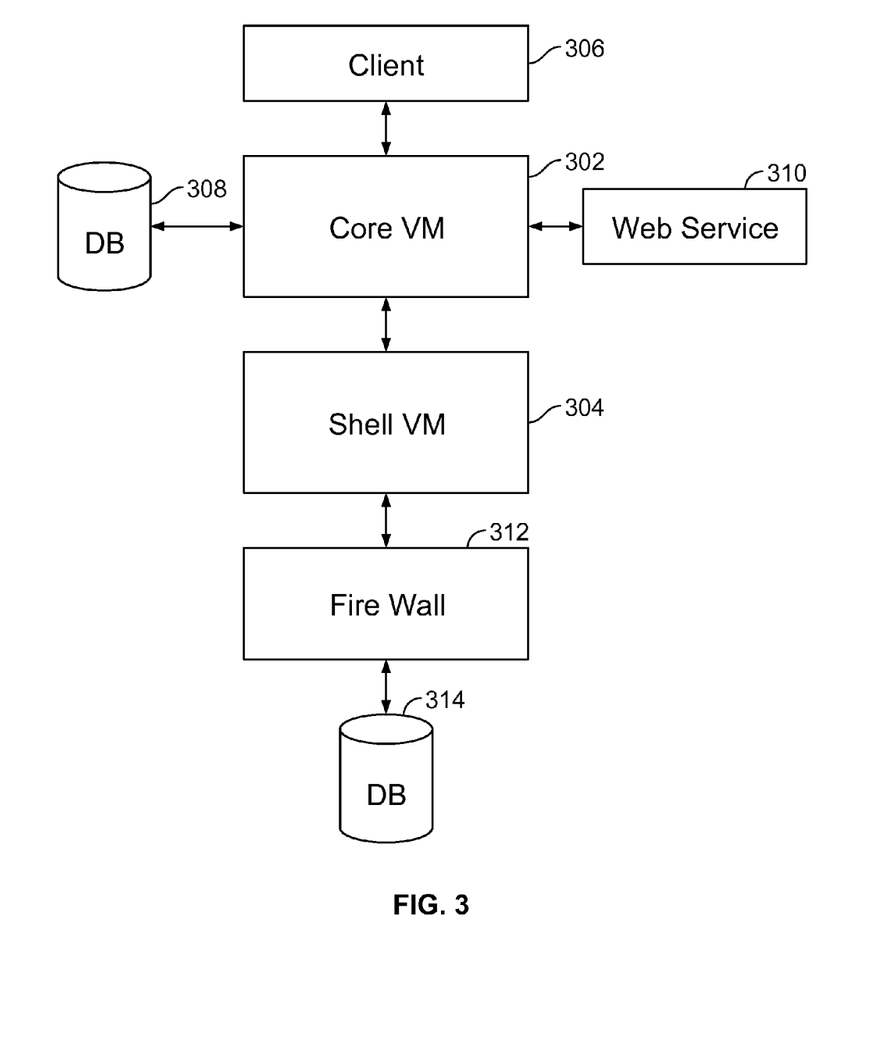
FIG. 3 is a block diagram illustrating an embodiment of a core VM supporting interactions with an external environment.

FIG. 3 is a block diagram illustrating an embodiment of a core VM supporting interactions with an external environment. Core VM 302 is supporting interactions with external environment resources: client 306, database 308, and web service 310. In some embodiments, core VM 302 is core VM 214 of FIGS. 2A-2C. In some embodiments, supporting the interaction includes opening, closing, and/or managing a network communication channel such a socket for a desired communication of an application/process at least in part running on the VM. Shell VM 304 is supporting interactions with external environment database 314 via firewall 312. Even though it is desirable for core VM 302 to manage interactions with database 314, interactions with database 314 cannot be managed by core VM 302 due to a security requirement of firewall 312 to not allow communications by core VM 302. Since shell VM 304 is allowed by firewall 312, interactions with database 314 is managed by shell VM 304. Communication calls for database 314 originating from the VM or the application executing within it are intercepted by core VM 302 and forwarded to shell VM 304 for support of the communication. In some embodiments, it is determined core VM 302 is not able to support interactions with database 314 at least in part by using predetermined configuration data. In some embodiments, it is determined core VM 302 is not able to support interactions with database 314 at least in part by a failed attempt by core VM 302 to initiate communication with database 314.

Figure 4:
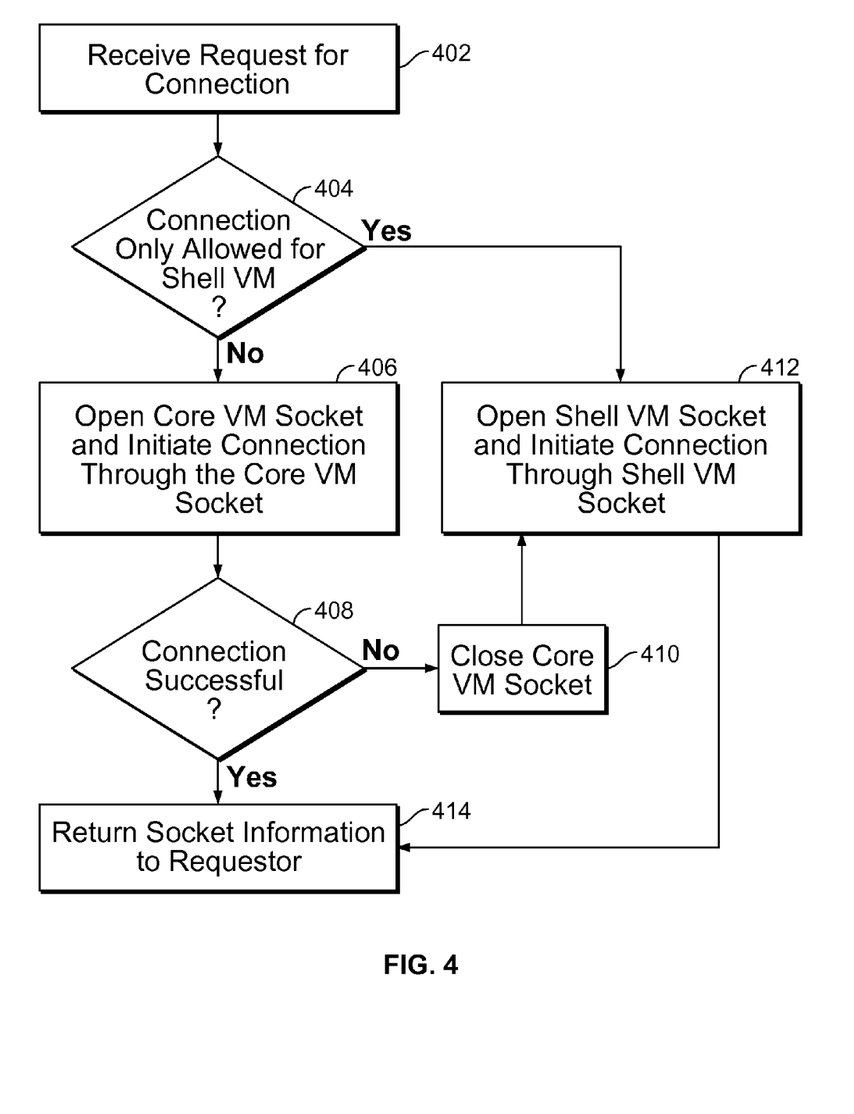
FIG. 4 is flowchart illustrating an embodiment of a process for processing a request for a connection.

FIG. 4 is flowchart illustrating an embodiment of a process for processing a request for a connection. Processing the request for the connection is included in supporting a communication with an external environment. In some embodiments, the process of FIG. 4 is implemented in a core VM such as core VM 214 of FIGS. 2A-2C and/or core VM 302 of FIG. 3. At 402, a request for an external environment connection is received. In some embodiments, the request is received from an application such as application 210 of FIG. 2 that is running on a segmented VM. In the example shown, the request for the external environment connection includes a request for a networking connection. At 404, it is determined whether the requested connection is only allowed by a shell VM. If the requested connection is only allowed by a shell VM, the core VM is not allowed to initiate the connection. In some embodiments, the determination is made using an inclusion and/or an exclusion list. For example a list of identifiers of connections that are allowed and/or not allowed for a shell VM and/or a core VM is used to make the determination. Examples of the identifier of connections include at least a portion of one or more of the following: a network address, a network socket identifier, a network port identifier, an application identifier, a physical connection identifier, a virtual connection identifier, a device identifier, a I/O identifier, and any hardware and/or software identifier that can be associated with the connection. In some embodiments, an IP (Internet Protocol) address range, a port range, and/or a Media Access Control (MAC) address range that is allowed to be connected by the core VM is specified. In some embodiments, a set of tuples (e.g., IP address range and port number range tuple) to which a connection by the core VM is allowed is specified. In some embodiments, the connection is only allowed for the shell VM if the connection is not associated with a connection-oriented data stream such as TCP (Transport Control Protocol).

If the requested connection not only allowed for the shell VM, at 406 a core VM socket is opened and the connection initiated through the core VM socket. Using the socket is merely an example. In various embodiments, one or more other and/or additional types of connection identifiers can be opened and used to initiate the connection. For an external connection, opening the core VM socket includes using an external communication interface of a core VM device hosting the core VM. For an internal connection to another application on the core VM device, an internal communication interface is used. For example, cross-memory communication is performed within the core VM device. In some embodiments, initiating the connection includes attempting to communicate with an external resource using the connection. If at 408 it is determined the connection is not successful, at 410 the core VM socket is closed. If at 404, the requested connection is determined to be only allowed for the shell VM, or at 408 the connection is determined to be successful and at 410 the core VM socket is closed, at 412 a shell VM socket is opened and the connection is initiated through the shell VM socket. In some embodiments, although the external resource of the requested communication is reachable by the core VM, the shell VM initiates the connection. For example, the external resource of the connection requires authentication using the shell VM because the external destination uses the network address of the shell VM to authenticate the VM. In some embodiments, the shell VM initiates connection at least in part because a connection through the shell VM device is of a more desirable network characteristic (e.g., higher bandwidth, lower latency, lower cost, etc.) than a connection through the core VM device. At 414, the socket information of either the core VM or the shell VM is returned to the requestor of the connection. For example, the information of the successfully initiated socket is returned to the application that requested the connection. In some embodiments, if the connection through the shell VM is not successful, an error is raised and/or an error is return to the connection requestor.

Figure 5:
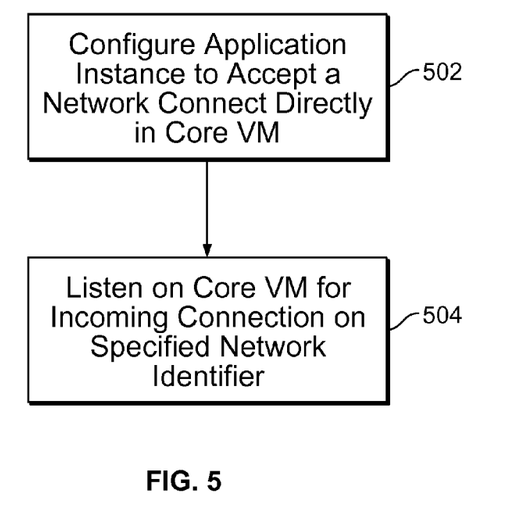
FIG. 5 is a flowchart illustrating an embodiment of a process for accepting on a core VM an incoming external connection.

FIG. 5 is a flowchart illustrating an embodiment of a process for accepting on a core VM an incoming external connection. In some embodiments, accepting the incoming external connection is included in supporting a communication with an external environment. At 502, an application/process instance is configured to accept a network connection directly on the core VM device hosting the core VM. The application is hosted/running on the core VM. In some embodiments, configuring the application includes specifying one or more network connection identifiers that can be used to listen and accept an incoming external network connection. At 504, the core VM listens (e.g., monitors a communication interface) for an incoming connection on a specified network identifier. In some embodiments, the specified network identifier is specified during the configuration of the application in 502. In some embodiments, the network identifier includes at least a portion or a range of one or more of the following: an IP address, a port number, a socket number, and other types of network addresses and/or identifiers. The network identifier may be specified automatically (e.g. using DHCP) or by a manager (e.g., resource manager 204 of FIGS. 2A-2C). If the incoming connection is detected on the specified network identifier, the connection is accepted and a connection is established between the external resource of the incoming connection and an application/process of the VM. In some embodiments, the segmented virtual machine appears to the external environment as a virtual machine addressable using a plurality of network addresses. For example, an IP address is associated with the shell VM and a different IP address is associated with the core VM. In some embodiments, the core VM listens for the connection using the shell VM. For example if both the shell VM and the core VM are listening for a connection on the same network identifier, the VM appears to the incoming external communicator as a VM that addressable with multiple IP addresses (e.g., multi-homed).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of interacting with an external environment of a segmented virtual machine, comprising:
receiving an indication that a communication with the external environment is desired;
determining, based at least in part on a specified network connection identifier associated with a network connection, whether the communication is allowed to be initiated directly from a core virtual machine of the segmented virtual machine without initiating the communication from a shell virtual machine of the segmented virtual machine, wherein the shell virtual machine and the core virtual machine cooperate to function as a single virtual machine;
wherein the core virtual machine supports internal execution functionality of the segmented virtual machine and a portion of external communication while the shell virtual machine supports another portion of the external communication; and
attempting to initiate the communication based as at least in part on the determination including:
in the event that it is determined, based on the specified network connection identifier wherein the specified network connection identifier is based at least in part on an inclusion list that specifies one or more identifiers of one or more network connections, that the communication is allowed to be initiated directly from the core virtual machine without initiating the network connection from the shell virtual machine, initiating the network connection to the external environment directly through the core virtual machine; and
in the event that it is determined, based on the specified network connection identifier wherein the specified network connection identifier is not listed in the inclusion list, that the communication is not allowed to be initiated directly from the core virtual machine, initiating the network connection through the shell virtual machine.

2. The method as recited in claim 1, wherein if initiating the network connection to the external environment directly through the core virtual machine is not successful, the network connection is initiated from the shell virtual machine.

3. The method as recited in claim 1, wherein the indication is received from an application executing in the segmented virtual machine.

4. The method as recited in claim 3, wherein receiving the indication includes intercepting on the core virtual machine a request by the application for the external environment communication.

5. The method as recited in claim 1, wherein attempting to initiate the communication includes attempting to open a network communication channel.

6. The method as recited in claim 1, wherein the inclusion list of one or more identifiers includes at least a portion of one or more of the following: a network address identifier, a network socket identifier, and a network port identifier.

7. The method as recited in claim 1, wherein the inclusion list of one or more identifiers includes one or more of the following: an Internet Protocol address range, a port number range, and a MAC address range.

8. The method as recited in claim 1, wherein the inclusion list of one or more identifiers includes at least a portion of one or more of the following: an application identifier, a device identifier, and an I/O identifier.

9. The method as recited in claim 1, wherein the determination is made at least in part by using an exclusion list that specifies one or more identifiers of a network connection that cannot be initiated directly from the core virtual machine without initiating the network connection from the shell virtual machine.

10. The method as recited in claim 1, wherein if it determined the communication is allowed to be initiated directly from the core virtual machine, attempting to initiate the communication includes performing a cross-memory communication within a device running the core virtual machine.

11. The method as recited in claim 1, wherein if it is determined the communication is allowed to be initiated directly from the core virtual machine, attempting to initiate the communication includes opening a core virtual machine network socket and initiating the communication using the core virtual machine network socket.

12. The method as recited in claim 11, wherein if the attempt to initiate the communication through the core virtual machine is not successful, the core virtual machine network socket is closed, a shell virtual machine network socket is opened, and the communication is initiated using the shell virtual machine network socket.

13. The method as recited in claim 1, wherein attempting to initiate the communication includes performing one or more of the following: a system call, a networking call, a file input/output call, a remote procedure call, and a native interface call.

14. The method as recited in claim 1, wherein the core virtual machine cannot initiate the communication because the external environment requires an authentication using the shell virtual machine.

15. The method as recited in claim 14, wherein the authentication uses a network address associated with the shell virtual machine to authenticate the communication.

16. The method as recited in claim 1, wherein the external environment includes one or more of the following: a web service, a web server, a messaging engine, a journaling facility, a load distributor, a network storage device, and a database.

17. The method as recited in claim 1, wherein attempting to initiate the communication includes specifying to an application a network identifier of a successfully initiated communication.

18. The method as recited in claim 1, wherein the core virtual machine is able to directly accept an incoming external environment communication.

19. The method as recited in claim 18, wherein the core virtual machine accepts the incoming communication at least in part by listening for the incoming communication on a specified network identifier.

20. The method as recited in claim 1, wherein the segmented virtual machine appears to the external environment as a virtual machine addressable using a plurality of network addresses.

21. The method as recited in claim 1, wherein the shell virtual machine and the core virtual machine are physically located on different devices.

22. The method as recited in claim 1, wherein the shell virtual machine does not execute virtual machine instructions.

23. The method as recited in claim 1, wherein the shell virtual machine is transparent to the external environment.

24. The method as recited in claim 1, wherein there exists a plurality of core virtual machines associated with the shell virtual machine.

25. The method as recited in claim 1, wherein the core virtual machine supports an application invoked from the shell virtual machine.

26. A system for interacting with an external environment of a segmented virtual machine, comprising:
   a processor configured to:
      receive an indication that a communication with an external environment is desired;
      determine, based at least in part on a specified network connection identifier associated with a network connection, whether the communication is allowed to be initiated directly from a core virtual machine of the segmented virtual machine without initiating the communication from a shell virtual machine of the segmented virtual machine, and attempt to initiate the communication based as at least in part on the determination, wherein the shell virtual machine and the core virtual machine cooperate to function as a single virtual machine;
      wherein the core virtual machine supports internal execution functionality of the segmented virtual machine and a portion of external communication while the shell virtual machine supports another portion of the external communication; and
      attempt to initiate the communication based as at least in part on the determination, including:
         in the event that it is determined, based on the specified network connection identifier wherein the specified network connection identifier is based at least in part on an inclusion list that specifies one or more identifiers of one or more network connections, that the communication is allowed to be initiated directly from the core virtual machine without initiating the network connection from the shell virtual machine, initiate the network connection to the external environment directly through the core virtual machine; and
         in the event that it is determined, based on the specified network connection identifier wherein the specified network connection identifier is not listed in the inclusion list, that the communication is not allowed to be initiated directly from the core virtual machine, initiate the network connection through the shell virtual machine; and
   a communication interface coupled with the processor.

27. A computer program product for interacting with an external environment of a segmented virtual machine, the computer program product being embodied in a non-transitory computer readable medium and comprising computer instructions for:
   receiving an indication that a communication with an external environment is desired;
   determining, based at least in part on a specified network connection identifier associated with a network connection, whether the communication is allowed to be initiated directly from a core virtual machine of the segmented virtual machine without initiating the communication from a shell virtual machine of the segmented virtual machine, wherein the shell virtual machine and the core virtual machine cooperate to function as a single virtual machine;
   wherein the core virtual machine supports internal execution functionality of the segmented virtual machine and a portion of external communication while the shell virtual machine supports another portion of the external communication; and
   attempting to initiate the communication based as at least in part on the determination including:
      in the event that it is determined, based on the specified network connection identifier wherein the specified network connection identifier is based at least in part on an inclusion list that specifies one or more identifiers of one or more network connections, that the communication is allowed to be initiated directly from the core virtual machine without initiating the network connection from the shell virtual machine, initiating the network connection to the external environment directly through the core virtual machine; and
      in the event that it is determined, based on the specified network connection identifier wherein the specified network connection identifier is not listed in the inclusion list, that the communication is not allowed to be initiated directly from the core virtual machine, initiating the network connection through the shell virtual machine.

28. The system as recited in claim 26, wherein if initiating the network connection to the external environment directly through the core virtual machine is not successful, the network connection is initiated from the shell virtual machine.

29. The system as recited in claim 26, wherein the indication is received from an application executing in the segmented virtual machine.

30. The system as recited in claim 29, wherein the processors is configured to receive the indication, including to intercept on the core virtual machine a request by the application for the external environment communication.

31. The system as recited in claim 26, wherein the processor is configured to attempt to initiate the communication, including to attempt to open a network communication channel.

32. The system as recited in claim 26, wherein the inclusion list of one or more identifiers includes at least a portion of one or more of the following: a network address identifier, a network socket identifier, and a network port identifier.

33. The system as recited in claim 26, wherein the inclusion list of one or more identifiers includes one or more of the following: an Internet Protocol address range, a port number range, and a MAC address range.

34. The system as recited in claim 26, wherein the inclusion list of one or more identifiers includes at least a portion of one or more of the following: an application identifier, a device identifier, and an I/O identifier.

35. The system as recited in claim 26, wherein the determination is made at least in part by using an exclusion list that specifies one or more identifiers of a network connection that cannot be initiated directly from the core virtual machine without initiating the network connection from the shell virtual machine.

36. The system as recited in claim 26, wherein if it determined the communication is allowed to be initiated directly from the core virtual machine, the processor is configured to attempt to initiate the communication, including to perform cross-memory communication within a device running the core virtual machine.

37. The system as recited in claim 26, wherein if it is determined the communication is allowed to be initiated directly from the core virtual machine, the processor is configured to attempt to initiate the communication, including to open a core virtual machine network socket and initiating the communication using the core virtual machine network socket.

38. The system as recited in claim 37, wherein if the attempt to initiate the network socket is closed, a shell virtual machine network socket is opened, and the communication is initiated using the shell virtual machine network socket.

39. The system as recited in claim 26, wherein the processor is configured to attempt to initiate the communication, including to perform one or more of the following: a system call, a networking call, a file input/output call, a remote procedure call, and a native interface call.

40. The system as recited in claim 26, wherein the core virtual machine cannot initiate the communication because the external environment requires an authentication using the shell virtual machine.

41. The system as recited in claim 40, wherein the authentication uses a network address associated with the shell virtual machine to authenticate the communication.

42. The system as recited in claim 26, wherein the external environment includes one or more of the following: a web service, a web server, a messging engine, a journaling facility, a load distributor, a network storage device, and a database.

43. The system as recited in claim 26, wherein the processor is configured to attempt to initiate the communication, including to specify to an application a network identifier of a successfully initiated communication.

44. The system as recited in claim 26, wherein the core virtual machine is able to directly accept an incoming external environment communication.

45. The system as recited in claim 44, wherein the core virtul machine accepts the incoming communication at least in part by listening for the incoming communication on a specified network identifier.

46. The system as recited in claim 26, wherein the segmented virtual machine appears to the external environment as a virtual machine addressable using a plurality of network addresses.

47. The system as recited in claim 26, wherein the shell virtual machine and the core virtual machine are physically located on different devices.

48. The system as recited in claim 26, wherein the shell virtual machine does not execute virtual machine instructions.

49. The system as recited in claim 26, wherein the shell virtual machine is transparent to the external environment.

50. The system as recited in claim 26, wherein there exists a plurality of core virtual machines associated with the shell virtual machine.

51. The system as recited in claim 26, wherein the core virtual machine supports an application invoked from the shell virtual machine.

* * * * *

UNITED STATES PATENT AND TRADEMARK OFFICE
CERTIFICATE OF CORRECTION

PATENT NO.        : 8,356,297 B1
APPLICATION NO.   : 11/726695
DATED             : January 15, 2013
INVENTOR(S)       : Posva et al.

It is certified that error appears in the above-identified patent and that said Letters Patent is hereby corrected as shown below:

In the claims,
In column 11, line 4, claim 36, insert --a-- after "perform".
In column 11, line 15, claim 38, after "initiate the", insert --communication through the core virtual machine is not successful, the core virtual machine--.

Signed and Sealed this
Twenty-eighth Day of June, 2016

Michelle K. Lee
*Director of the United States Patent and Trademark Office*